June 4, 1929.  O. W. MILLER  1,715,938
PROTECTOR BRACKET FOR HAND TRUCK BRAKES
Filed Feb. 9, 1927    2 Sheets-Sheet 1
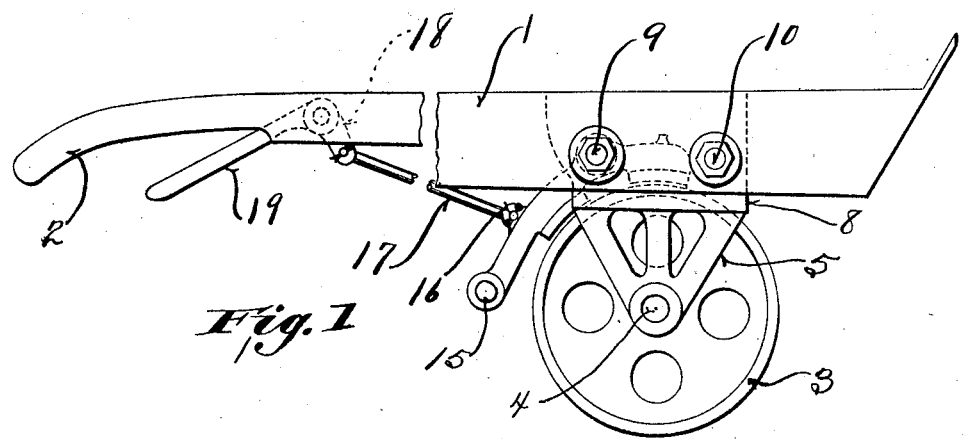
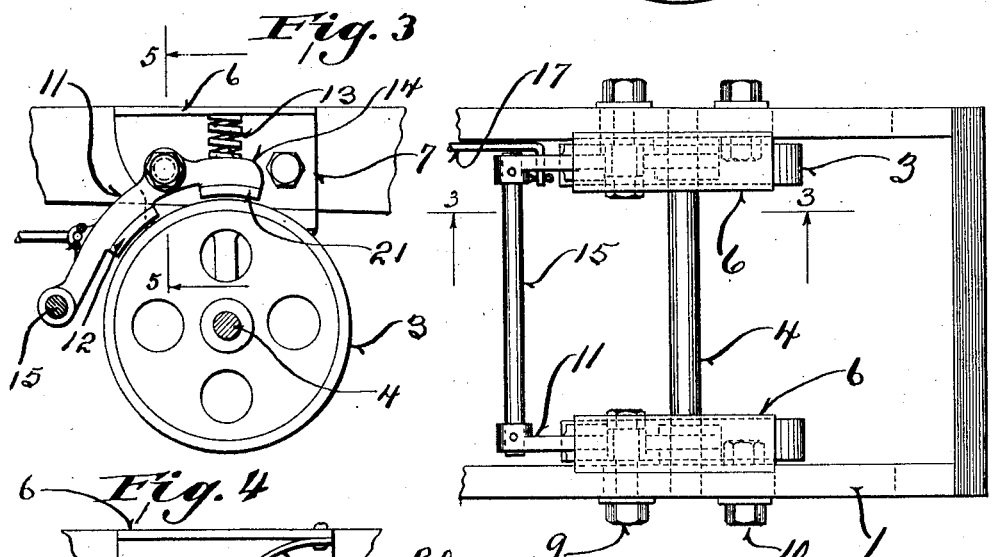
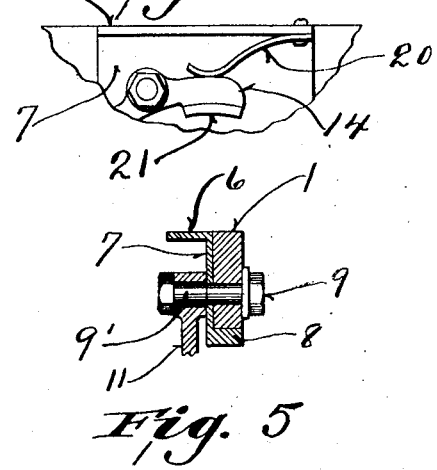
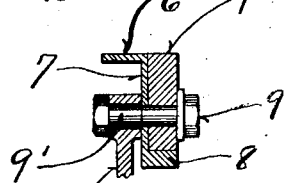
Inventor
Oscar W. Miller June 4, 1929.  O. W. MILLER  1,715,938

PROTECTOR BRACKET FOR HAND TRUCK BRAKES

Filed Feb. 9, 1927  2 Sheets-Sheet 2

Inventor
Oscar W. Miller
By
Attorneys

Patented June 4, 1929.

1,715,938

UNITED STATES PATENT OFFICE.

OSCAR W. MILLER, OF APPLETON, WISCONSIN.

PROTECTOR BRACKET FOR HAND-TRUCK BRAKES.

Application filed February 9, 1927. Serial No. 166,921.

This invention relates to brakes for trucks, and is particularly directed to a protector bracket for the brakes of hand trucks.

Objects of this invention are to provide a novel form of construction for a hand truck which is so made that the brakes may be applied either by the hand of the operator or by his foot, and in which means are provided for normally holding the brakes retracted or open, and also for guarding against inadvertent setting of the brakes or disturbance of their operation by the falling of loose packages through the truck and against the brake.

More specifically, objects of this invention are to provide a novel form of protector bracket for use on hand trucks equipped with brakes which protects the brakes fully and also houses and protects the springs, and at the same time is so positioned that it forms a guard over the wheels.

Embodiments of the invention are shown in the accompanying drawings in which:

Figure 1 is a side elevation of a truck equipped with the brake;

Figure 2 is a plan view of a portion of the structure shown in Figure 1;

Figure 3 is a sectional view on the line 3—3 of Figure 2;

Figure 4 is a fragmentary view corresponding to Figure 3 showing a modified form of construction;

Figure 5 is a sectional view on the line 5—5 of Figure 3.

Figure 6:
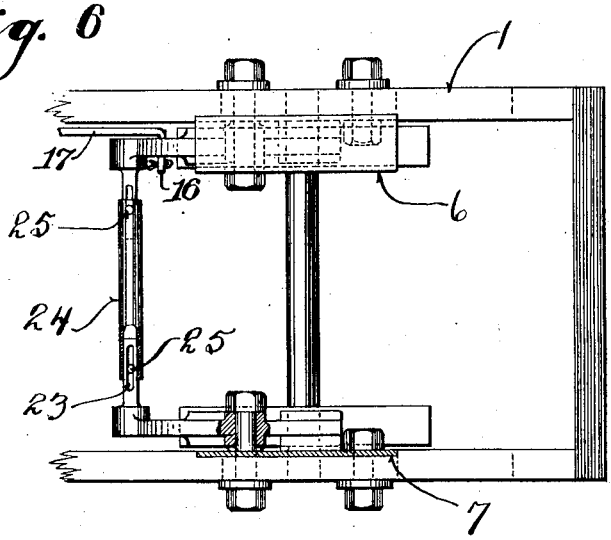
Figure 6 is a fragmentary plan view of a portion of a truck showing a modified form of the invention, certain parts being shown in section.

Referring to the drawings, it will be seen that the truck comprises a pair of side frames 1 terminating in handles 2 and supported by wheels 3. The wheels 3 are carried by a transverse shaft 4 which, in turn, is carried by the wheel brackets 5. These brackets 5 are preferably formed integral with a protecting member or guard plate 6 and are joined thereto by an integral plate-like portion 7. The brackets 5 are preferably offset with reference to the plate-like portion and are provided with an upper bearing member 8 which, as may be seen from Figure 5, is set directly beneath the side frame members 1. This affords a very firm support for these bearing members and does not call upon the retaining bolts 9 and 10 to carry the load of the truck.

Further, it is to be noted that the protecting members 6 extend inwardly over the wheels 3, but are spaced upwardly therefrom a material distance for a purpose hereinafter to appear.

It is to be noted that the bolts 9 are provided with enlarged portions 9' which fit through and form fulcrum points or pivot pins for the brake levers 11. These brake levers carry brake shoes 12 normally held out of engagement with the wheels by means of the compression springs 13. The springs 13 are carried between the protecting member 6 and an extension 14 of the brake levers. Preferably, an upturned tongue is formed on the brake levers and centering the springs, as shown in Figure 3.

The brake levers 11 are joined by a foot rod or pedal rod 15 which is rigidly secured to each of the levers, as shown in Figure 2, and extends transversely across the truck. Further, one of the brake levers is provided with an apertured lug 16 into which the angularly bent end of a connecting link 17 is pivoted. The other end of the link 17 is pivotally mounted in the short arm 18 of the hand lever 19. It is to be noted from Figure 1, that the parts are so set that the link 17 and the lever 18 form in effect a toggle joint so that a very high pressure of the brakes is readily secured without a great exertion on the part of the operator. Further, it is to be noted from Figure 1, that considerable leverage is also secured when the foot rod or pedal rod 15 is employed, as this is carried at the ends of the levers 11 while the brake shoes 12 are positioned more closely adjacent the pivot pins or bolts 9.

Further, it is to be noted that the projecting upper plate 6 not only houses the springs and protects and guards the brakes, but also extends over the wheels and, consequently, forms a guard for the wheels as well.

In the modified form shown in Figure 4, the same construction is followed with the exception, however, that a leaf spring 20 is substituted for the compression, helical springs 13. The leaf spring has one end riveted to the plate 6, and the other end upturned and riding upon the upper side of the extension 14.

In each form, it is preferable to provide a lug or projecting portion 21 integral with the plate 7 against which the extension 14 may bear to thus limit the opening motion of the brakes.

It will be seen that a very simple type of brake construction has been provided, and it will be noted further that the protecting bracket is of substantial and easily produced formation so that it may be cheaply manufactured and readily applied to the side frames of the conventional types of trucks.

Figure 7:
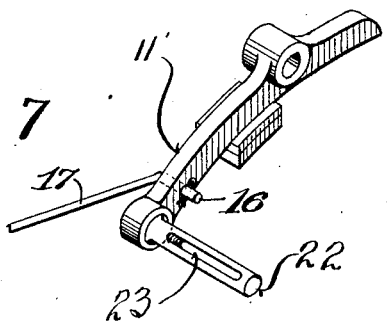
Figure 7 is a perspective view of one of the brake levers removed.
Figure 8:
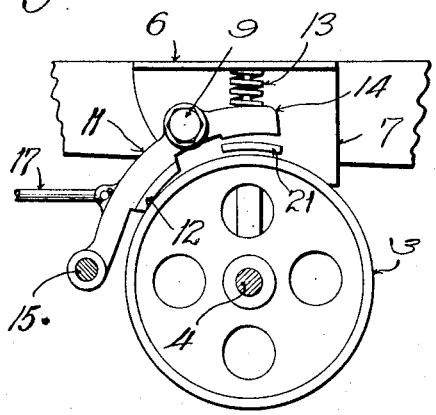
Figure 8 is a view similar to Figure 3 showing the brake applied.

In the modified form shown in Figures 6 and 7, substantially the same construction is followed as that previously described. In this form, each brake lever 11' is provided with an integral pin 22 which is cast therewith, and which is slotted, as indicated at 23. Thus, brake levers are made right and left and the pins 22 are joined by a slidable hollow sleeve 24, as shown in Figure 6. The sleeve carries pins 25 at opposite ends which pass through the slots 23 in the pins. The purpose of this construction is to provide an assembled brake unit which adjusts itself automatically to different widths of trucks.

This construction may, therefore, be sold as a unit and may be most easily applied to trucks with a minimum amount of effort and with a minimum change.

Further it will be seen that the protector bracket actually protects the brakes and prevents contact therewith by articles falling through the truck. It is set sufficiently high above the wheels to afford a space for the brakes and thus performs the double function of a guard for the brakes and a guard for the wheels.

Although the invention has been described in considerable detail, such description is intended as illustrative rather than limiting as the invention may be variously embodied and as the scope of such invention is to be determined as claimed.

I claim:

1. A hand truck comprising a pair of side frame members having handles, supporting wheels therefor, a pair of brackets carried by said side frame members, a transverse shaft carried by said brackets and upon which said wheels are mounted, said brackets having upwardly and inwardly extending portions positioned above said wheels, brake levers pivoted to said brackets and having resilient means for holding them in retracted position, said brake levers being mounted below the upper portion of said brackets, means for operating said brake levers by a foot of the operator, and means for operating said brake lever by the hand of the operator.

2. A hand truck comprising a pair of side frame members having handles, supporting wheels therefor, a pair of brackets carried by said side frame members, a transverse shaft carried by said brackets and upon which said wheels are mounted, said brackets having upwardly and inwardly extending portions positioned above said wheels, brake levers pivoted to said brackets and having resilient means for holding them in retracted position, said brake levers being mounted below the upper portion of said brackets, a transverse foot rod joining said brake levers, a hand lever mounted adjacent the handles, and a connecting link joining said hand lever with said brake levers.

3. In a truck having side frame members and handles, the combination of a pair of brackets having downwardly extending portions, a transverse shaft carried by said brackets, supporting wheels mounted upon said shaft, said brackets having an upwardly extending portion contacting with said side frame members and provided with an inwardly extending, overhanging portion, brake levers pivoted to said brackets and mounted beneath said overhanging portion and adapted to engage said wheels, springs positioned between said brake levers and said overhanging portions, a foot pedal bar for operating said brake levers, and a hand lever joined to said brake levers and mounted adjacent one of the handles of said truck.

4. A hand truck comprising a pair of side frame members having handles, supporting wheels therefor, a pair of brackets carried by said side frame members, a transverse shaft carried by said brackets and upon which said wheels are mounted, said brackets having upwardly and inwardly extending portions positioned above said wheels, brake levers pivoted to said brackets and having resilient means for holding them in retracted position, said brake levers being mounted below the upper portion of said brackets, and a transverse foot rod joining said brake levers, said transverse foot rod being of telescopic formation, whereby the length of such transverse foot rod may be adjusted.

In testimony that I claim the foregoing I have hereunto set my hand at Appleton, in the county of Outagamie and State of Wisconsin.

OSCAR W. MILLER.